United States Patent

Augie

[11] Patent Number: 5,797,250
[45] Date of Patent: Aug. 25, 1998

[54] FORAGE HARVESTER FEED ROLL ASSEMBLY DESIGNED FOR MINIMIZING FALSE TRIPPING OF A METAL DETECTOR SYSTEM

[75] Inventor: Patrick Augie, Ottumwa, Iowa

[73] Assignee: Deere & Company, Moline, Ill.

[21] Appl. No.: 722,597

[22] Filed: Sep. 27, 1996

[51] Int. Cl.$^6$ ................................................. A01D 75/18
[52] U.S. Cl. ................................ 56/10.2 J; 56/DIG. 15
[58] Field of Search ...................... 56/10.2 J, DIG. 15; 324/243, 246

[56] References Cited

U.S. PATENT DOCUMENTS

| | | | |
|---|---|---|---|
| 3,972,156 | 8/1976 | Bennett, Jr. et al. | 56/10.2 |
| 4,193,248 | 3/1980 | Gilleman | 56/10.2 |
| 4,196,861 | 4/1980 | Bass et al. | 241/101.7 |
| 4,758,788 | 7/1988 | Weiss et al. | 56/10.2 J |
| 4,805,385 | 2/1989 | Bohman et al. | 56/10.2 |
| 5,070,682 | 12/1991 | Bohman | 56/10.2 J |
| 5,504,428 | 4/1996 | Johnson | 324/243 |

FOREIGN PATENT DOCUMENTS

| 3341071 | 5/1984 | Germany | 56/10.2 J |
|---|---|---|---|

*Primary Examiner*—Terry Lee Melius

[57] ABSTRACT

A forage harvester includes a feed roll assembly for feeding a mat of crop across a fixed shear bar located adjacent a rotating cutterhead for cooperating with the cutterhead knives to cut the mat of crop into lengths. The feed roll assembly includes front and rear lower feed rolls mounted in opposition to and for being contra-rotated relative to front and rear upper feed rolls. The upper feed rolls are carried by a downwardly biased link assembly that is pivotally mounted for permitting the upper feed rolls to move up and down relative to the lower feed rolls in response to varying amounts of crop passing between the lower and upper pairs of feed rolls. A metal detector is mounted within the lower front feed roll and normally operates to a generate a balanced field which extends into the crop feed zone above the lower front feed roll. When a foreign object made of magnetic material passes into the balanced field, it causes the field to become unbalanced resulting in the sending out of a trip signal which actuates a system for immediately stopping the drive to the feed rolls so as to prevent the foreign object from being fed into the cutterhead. Hardened rings are located on the upper front feed roll support shaft and they serve as the inner race for cup bearings used to rotatably support the upper front feed roll on the support shaft.

2 Claims, 3 Drawing Sheets

FORAGE HARVESTER FEED ROLL ASSEMBLY DESIGNED FOR MINIMIZING FALSE TRIPPING OF A METAL DETECTOR SYSTEM

BACKGROUND OF THE INVENTION

The present invention relates to a forage harvester feeding system for feeding crop material to a cutterhead, and more particularly relates to a feeding system embodying a metal detector system for preventing crop borne foreign metal objects from coming into contact with the cutterhead.

A typical forage harvester feed roll assembly includes opposed upper and lower pairs of feed rolls driven in such directions that crop material gathered from a field by a forward mounted header and delivered to the inlet of the feed roll assembly, that is to the pinch point or bite of the opposed upper and lower forward rolls, is conveyed rearwardly in an approximately horizontal mat between the upper and lower pairs of rolls and over a stationary shear bar. As the mat of crop passes over the shear bar, the cutterhead knives sweep over the shear bar and cooperate therewith to cut the mat of crop into short lengths. U.S. Pat. No. 4,196,861 granted to Bass et al. on 8 Apr., 1980 discloses such a feed roll assembly.

In order to prevent damage to the cutterhead, its drive line, and other parts of the forage harvester as result of the cutterhead coming into contact with foreign metal objects, such as rake teeth or other parts of machinery that have somehow been deposited in a field, for example, it is known to equip the forage harvester with a metal detector system including a metal detector, embodied in the lower front feed roll, which acts to establish a balanced magnetic field across the feed zone through which the mat of crop passes on its way to the cutterhead, the detector sending an electrical "trip" signal which sets off an alarm and initiates a chain of events resulting in an immediate braking of the drive for the feed rolls for preventing a foreign metal object from reaching the cutterhead whenever the balance of the magnetic field is disrupted by the presence of the foreign metal object in the crop mat. U.S. Pat. No. 3,972,156 granted to Bennett et al. on 3 Aug. 1976; and U.S. Pat. No. 5,504,428 granted to Johnson on 2 Apr. 1996 each disclose a metal detector, as described above, for establishing a normally balanced field across the path traversed by the mat of crop. U.S. Pat. No. 4,193,248 granted to Gilleman on 18 Mar. 1980 discloses the feed roll drive control device, mentioned above, which is actuated by the "trip" signal sent by the metal detector when a foreign metal object is detected in the mat of material being fed to the cutterhead.

In the patented metal detector systems, the lower front feed roll contains the metal detector and is constructed of stainless steel so as to be transparent to the field generated by the metal detector. The upper front feed roll is likewise constructed of stainless steel so that its presence does not cause a false trip signal to be sent by the metal detector. This is done, despite the fact that the upper front feed roll is of a regular shape and under ideal conditions would not cause an irregularity in the balanced magnetic field established by the metal detector, due to the mass of the upper front feed roll being so large that any non-uniform movement of the feed roll across its length does result in the magnetic field becoming unbalanced causing a false trip signal. However, heretofore, designers have thought that because of its relatively small size and relatively large spacing from the metal detector, the shaft supporting the upper front roll could be made of magnetic material without causing false trip signals to be sent by the metal detector. Further, steel which is magnetic is less expensive and is otherwise more desirable for use as support shafts than stainless steel since, in contrast to stainless steel, the former steel may be hardened so as to permit bearings to run directly on the shaft without causing undue wear.

In any event, the prior art forage harvester designs of the above-noted type still experience the problem of their metal detectors sensing false trip signals. To avoid false trip signals from becoming a nuisance during operation, it is necessary to reduce the sensitivity of the metal detector, i.e., raise the threshold at which the trip signal is sent out. This results in instances where foreign metal objects located in the upper part of the crop mat and/or of small size go undetected, with the consequence that the objects pass into the cutterhead and possibly cause damage. A metal detector system which is designed to address this problem is disclosed in U.S. Pat. No. 4,805,385 granted to Bohman et al. on 21 Feb. 1989. Specifically, recognizing that the possibility of false tripping for a given metal detector sensitivity decreases as the distance from the metal detector to the upper front roll increases, this patent teaches the idea of increasing and decreasing the sensitivity of the metal detector in response to up and down movements of the upper front roll caused by varying thicknesses of the crop mat passing between the rolls. While this metal detector system does result in decreasing the incidence of false tripping while ensuring the detection of foreign metal objects contained in an upper portion of a relatively thick mat of crop, the metal detector system is somewhat complicated and some false tripping occurs anyhow.

Through extensive testing, it has been found that the magnetizable metal shaft supporting the upper front feed roll indeed does cause the balanced field generated by the metal detector to become unbalanced and, thus, is the root cause of some incidence of false tripping. The testing showed that, with the feed rolls assembled as disclosed in the aforementioned U.S. Pat. No. 4,196,861, false tripping was more apt to occur during quick up and down movements and/or during fore-and-aft movements of the upper front roll support shaft.

SUMMARY OF THE INVENTION

According to the present invention there is provided an improved feed roll assembly for use with a metal detector.

An object of the invention is to provide a feed roll assembly constructed in such a way as to permit the sensitivity of the metal detector to be set at a value high enough for sensing metal objects located in an upper portion of the crop mat being fed between the rolls of the feed roll assembly.

A more specific object of the invention is to provide a feed roll assembly including a stainless steel lower front feed roll containing a metal detector for establishing a magnetic field located for traversing a mat of crop passing over the roll, and further including an upper front feed roll made of non-magnetic material and being rotatably supported on a shaft likewise made of non-magnetic material such as stainless steel.

Yet another object of the invention is to provide a feed roll assembly as set forth in the immediately preceding object wherein the feed roll is rotatably supported on the stainless steel shaft by respective assemblies at opposite ends of the feed roll including a hardened ring located on the shaft and a cup bearing being mounted over the inner ring such that the hardened ring serves as an inner race for bearing elements of the cup bearing.

3

These and other objects of the invention will become apparent from a reading of the ensuing description together with the appended drawings.

DESCRIPTION OF THE PREFERRED EMBODIMENT

Figure 1:
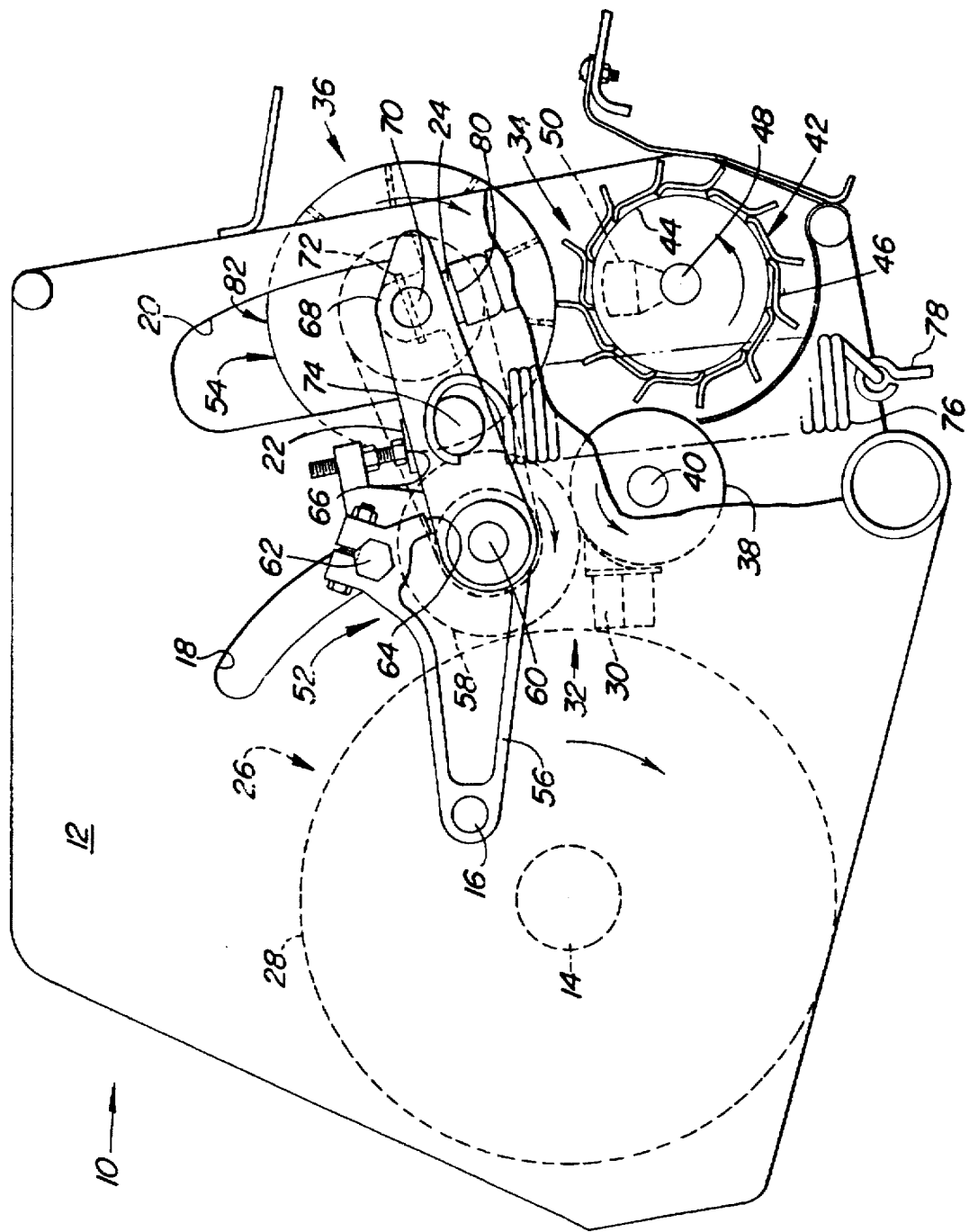
FIG. 1 is a semi-schematic, partial side elevational view of the feed roll assembly and cutterhead of the forage harvester with a portion of the feed roll assembly side sheet cut away to show the relationship between the lower front feed roll, which carries the metal detector sensor, and the upper front feed roll constructed in accordance with the present invention.

Referring now to FIG. 1, there is shown a feeding and cutterhead assembly 10 of a forage harvester, not otherwise shown. The assembly 10 includes a pair of spaced apart, generally similar but opposite upright, left- and right-hand side sheets 12 serving as frame members to support and house the feeding and cutterhead components. The side sheets 12 are suitably reenforced and supported on the forage harvester frame (not shown) by subframe members not discussed here. Each side sheet 12 includes a cutterhead mount 14, indicated only schematically, a rigidly attached feed roll assembly pivot 16 spaced upwardly and forwardly from the mount 14, a feed roll assembly clearance slot 18 spaced upwardly and forwardly of, and formed arcuately about the pivot 16, and a larger irregularly shaped fed roll clearance slot 20 spaced forwardly of the slot 18. A first or rear downstop 22 is fixed to the outer side of each of the side sheets 12 at respective locations between lower parts of the slots 18 and 20, and a second or front downstop 24 is fixed to the outer side of each of the side sheets 12 at respective locations below the slots 20.

Disposed between a lower rear portion of the opposite side sheets 12 and journalled at the mounts 14 is a cutterhead assembly 26 of a conventional type including a cylindrical knife support drum supporting a plurality of knife segments, with only the cylindrical path traced by the knife segment cutting edges being shown at 28. A stationary shear bar 30 extends between the side sheets 12 and is supported therefrom at a location at the forward side of the cutterhead assembly 26 and is positioned so that the knife segment cutting edges sweep across a rear face of the shear bar 30 so as to cut crop into pieces of a preselected length as the crop passes over the shear bar 30.

Crop is delivered to the shear bar 30 by a feeding conveyor assembly 32 located between the opposite side sheets 12 and immediately ahead or upstream of the cutterhead assembly 26. Specifically, the conveyor assembly 32 includes a fixed lower conveyor assembly 34 and an opposing, yieldably floating upper conveyor assembly 36. The lower conveyor assembly 34 includes a lower rear roll 38, positioned adjacent the shear bar 30 and mounted for rotating about an axle or shaft 40; and a lower front roll 42 comprising a cylindrical drum 44 supporting a plurality of flutes or ribs 46 and being mounted for rotating about an axle or shaft 48. A sensor 50 of a metal detector system, not otherwise shown, is mounted to the shaft 48 and is operable to create a magnetic field oriented so as to establish flux lines that are directed so as to pass substantially vertically through a mat of crop passing over the lower front roll 42. In order to permit the magnetic field to be thus established, the drum 44 and ribs 46 are made of a material that is non-magnetic, such as an austenitic alloy steel.

The upper conveyor assembly 36 includes rear and front feed roll assemblies 52 and 54, respectively. The rear feed roll assembly 52 consists of a pair of opposite radius arms 56 extending forwardly alongside the outer surfaces of the side sheets 12 and having rear ends mounted for pivoting about the mounts 16. An upper rear feed roll 58 is mounted to forward ends of the radius arms 56 by a shaft 60 extending between the side sheets 12 and having opposite end portions respectively projecting through the arcuate slots 18. The radius arms 56 are coupled together for moving in unison by a transverse bar 62 extending between the side sheets 12 and having opposite end sections respectively extending through the arcuate slots 18 and being clamped to the arms 56. Formed integrally at a forward lower location of each arm 56 is a pivot stop 64 and carried at a forward end of each arm 56 is an adjustable stop 66 for engaging the rear downstop 22. Respectively mounted for pivoting about the opposite ends of the upper rear roll shaft 60 are a pair of upper front roll support arms 68 to which opposite ends of an upper front roll support shaft 70 is pinned, as at 72, the shaft 70 extending between the side sheets 12 and having opposite end sections projecting through the forward clearance opening 20. The pivot stop 64 of each radius arm 56 is located to engaged an upper surface of the adjacent front roll support arm 68 so as to limit relative pivoting, one to the other, of the radius and front roll support arms. Formed integrally with and projecting outwardly from each arm 68 at a location about midway between opposite ends of each arm 68 is a spring end receiving lug 74, and mounted to each lug 74 is a hook at an upper end of a coil tension spring 76 having a hook at its lower end coupled to an adjustable eye-bolt 78. Thus, a downward bias is applied to the arms 68, with the latter each having a pad 80 formed on a lower forward surface for engagement with the front downstop 24.

Figure 2:
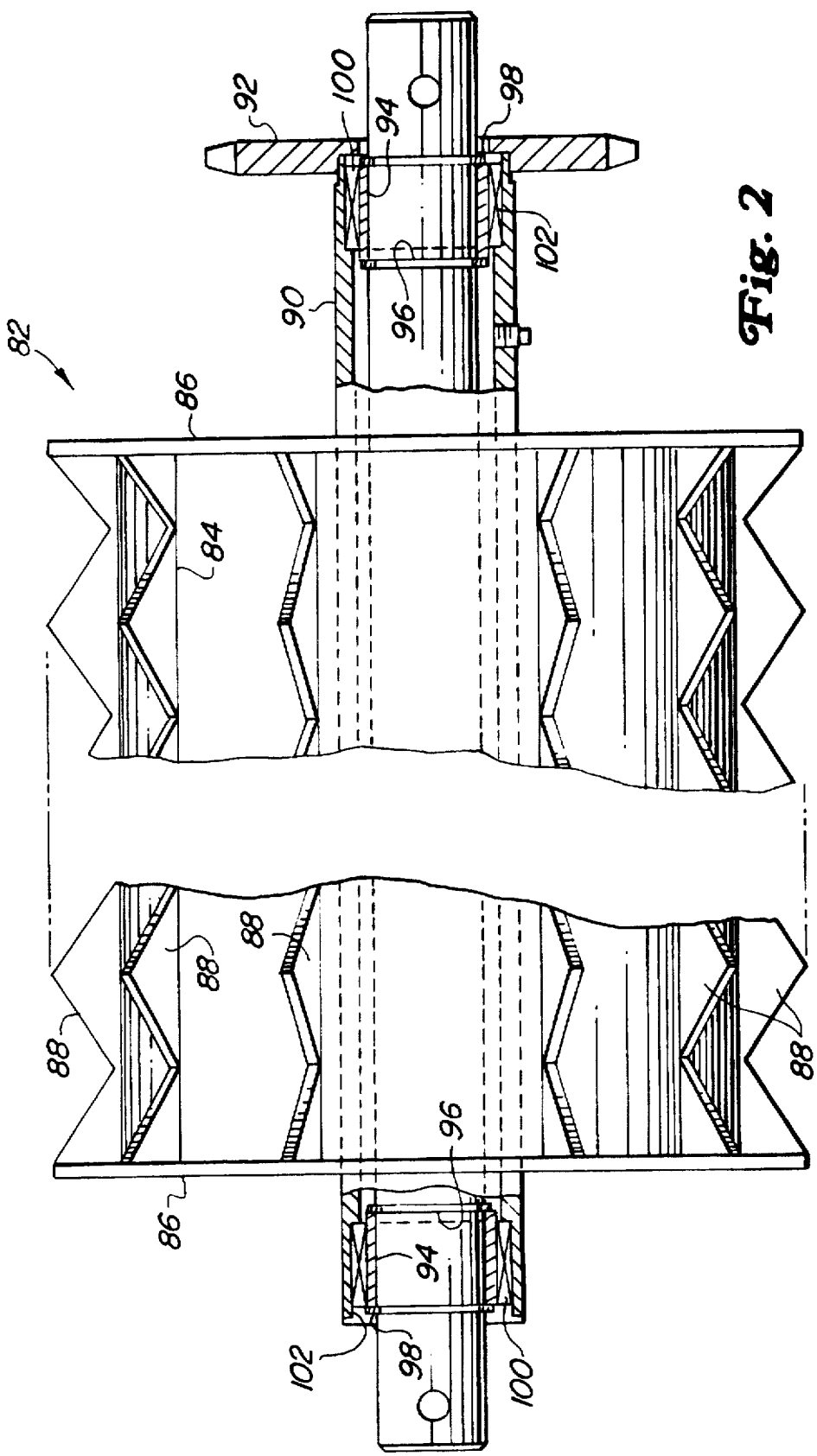
FIG. 2 shows the upper front feed roll assembly with parts in section disclosing the manner in which the feed roll is rotatably supported from its support shaft.

Mounted, in a manner described below, for rotating about the shaft 70 is an upper front feed roll 82, which is made of austenitic steel. Referring now also to FIG. 2, it can be seen that the feed roll 82 includes a cylindrical drum 84 having its opposite ends closed by circular plates 86 of a diameter greater than that of the drum and between which extend a plurality of toothed ribs 88 that are fixed to angularly spaced locations about and extend radially from the drum. As thus far described, the structure is conventional.

Arranged coaxially about the roll support shaft 70 is a hollow drive shaft 90 which projects through and is fixed to the circular plates 96. A drive sprocket 92 is fixed to a right-hand end of the shaft 90. Of significance is the fact that the shaft 70 is made of austenitic steel. Because this shaft material does not have the requisite hardness for serving as the inner race for a support bearing, a hardened inner bearing ring 94 is mounted on each end of the shaft 70 held in place by inner and outer snap rings 96 and 98, respectively, located in inner and outer grooves provided in the shaft at opposite ends of each bearing ring 94. Provided for use with each inner bearing ring 94 is a drawn cup bearing 100 (the Torrington Company of Torrington, Conn. is a source for such a bearing) including a plurality of needle bearings which roll against the outside diameter of the bearing ring 94 with which it is used and including a cup portion having a cylindrical outer wall received in an annular bearing recess 102 formed in each end of the hollow drive shaft 90. Thus, it will be appreciated that the drive shaft 90 is mounted for rotating freely about the support shaft 70.

Figure 3:
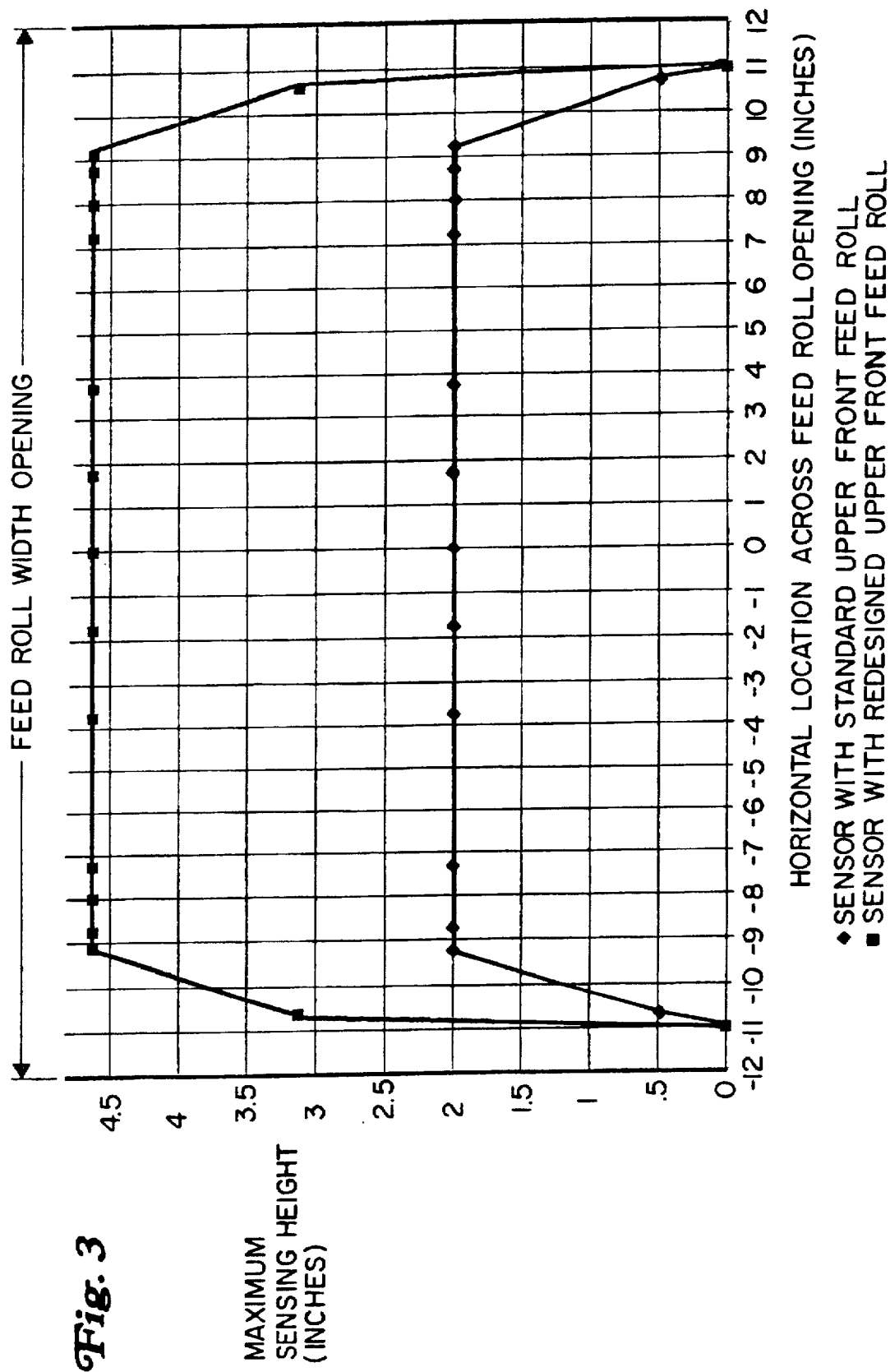
FIG. 3 is a graph showing the improved sensing range of the metal detector achieved by making the upper front feed roll shaft of stainless steel instead of magnetizable steel.

Referring now to FIG. 3, there is shown a graph which depicts a comparison which shows the increase in sensitivity achieved by changing the material of the upper front feed roll shaft from magnetizable steel to stainless steel. Sensing height is measured from the top of the lower front roll and is indicated along the left side of the graph starting at zero and increasing vertically. Data points along the width of the upper and lower front feed rolls is indicated at the bottom of the graph with zero indicating the halfway point between opposite ends of the rolls, and with data points to the left and right of the halfway point being indicated by negative and positive numbers, respectively, increasing from the halfway point.

An initial test run was made with the upper front roll supported by the standard, magnetizable steel shaft. It was found that, in order to avoid false tripping, the sensitivity of the metal detector had to be adjusted so that the generated field effectively extended only two inches above the lower front feed roll. The resulting data points of this test are shown plotted on the graph using diamond shaped indicators.

A second set of data points was obtained by substituting a stainless steel shaft for the standard upper front feed roll support shaft. The sensitivity of the metal detector was then increased to the point where the maximum sensing height was 4⅝". Even though this height is more than twice that achievable using the standard shaft, no false tripping occurred at this sensitivity. The resultant data points of this test are shown plotted on the graph using square shaped indicators. Thus, it will be appreciated that the data show that a significant increase in sensitivity is achievable by using a stainless steel upper front roll support shaft as opposed to the standard magnetizable steel shaft.

The operation of the crop feeding conveyor assembly 32 is thought to be clear from the foregoing description. Suffice it to say that the front and rear, upper and lower sets of feed rolls 82, 42 and 58, 38, respectively, will act to compress cut crop into a mat which passes over the shear bar 30 and is cut into lengths by the knives forming part of the cutterhead 26.

Depending on the volume of crop encountered at any one location as the harvester travels across the field, the spring-loaded upper front and rear rolls 82 and 58 will rise and fall as permitted by the pivot connection 16. The sensor 50 in the lower front feed roll 42 establishes a balanced magnetic field which traverses the mat of crop passing over the roll 42. In the event that a ferrous object should be located in this crop mat, it will disturb the balance of the magnetic field causing the control to be tripped for effecting braking of the feed rolls in a manner to immediately stop their rotation. Sensitivity of the metal detector 50 is maintained at a relatively high value while false tripping is eliminated or, at least minimized, due to the fact that the upper front roll control shaft 70 is made of austenitic or non-magnetic steel.

I claim:

1. In a forage harvester including a rotatably supported cutterhead having knives located for sweeping across a stationary shear bar for cutting a mat of crop being fed across the shear bar into lengths, a feed roll assembly for feeding the mat of crop to the cutterhead, the feed roll assembly including a pair of opposed contra-rotating closely spaced feed rolls including lower and upper feed rolls constructed of non-magnetic material, a metal detector being fixedly mounted within said lower feed roll and positioned for generating a balanced magnetic field in a crop feed zone above said lower feed roll, a pair of parallel link assemblies being mounted for swinging vertically about a fixed horizontal transverse axis, an upper feed roll support shaft having opposite ends respectively fixed to said pair of parallel link assemblies, and bearings rotatably supporting said upper feed roll on said upper feed roll support shaft, the improvement comprising: said upper feed roll support shaft being non-magnetic.

2. The forage harvester as defined in claim 1 wherein a pair of hardened rings are respectively located at a pair of locations spaced from each other along said upper feed roll support shaft; and said bearings being a pair of cup bearings respectively mounted on said pair of hardened rings so that the latter each serve as an inner bearing race.

* * * * *